United States Patent [19]

Yao

[11] Patent Number: 5,316,670
[45] Date of Patent: May 31, 1994

[54] FILTERING DEVICE FOR AQUARIUMS

[76] Inventor: Chia W. Yao, No. 7, Tzu Li I St., Nan Kang Industrial Dist., Nan Tou City, Taiwan

[21] Appl. No.: 942,978

[22] Filed: Sep. 9, 1992

[51] Int. Cl.$^5$ ............................................. A01K 63/04
[52] U.S. Cl. ................................. 210/169; 210/416.2; 119/259; 119/261
[58] Field of Search .................. 210/169, 416.2; 119/5

[56] References Cited

U.S. PATENT DOCUMENTS

| | | | |
|---|---|---|---|
| 3,717,253 | 2/1973 | Lovitz | 210/169 |
| 4,186,093 | 1/1980 | Willinger | 210/169 |
| 4,753,723 | 6/1988 | Willinger | 210/169 |
| 4,802,980 | 2/1989 | Gilkey et al. | 210/169 |
| 4,842,726 | 6/1989 | Willinger | 210/169 |
| 5,169,520 | 12/1992 | Wang | 210/169 |

Primary Examiner—Stanley S. Silverman
Assistant Examiner—Robert James Popovics
Attorney, Agent, or Firm—Alan T. McCollom

[57] ABSTRACT

A filtering device including a lower housing engaged on a base and communicated with the base, an upper housing disposed above the lower casing, a tube communicating the base to the upper housing, a motor disposed in the upper housing for drawing the water contained in the base, and a pipe extended into the tube for supplying air into the tube and for forcing the water move upward through the tube when the motor is not energized.

4 Claims, 4 Drawing Sheets

FILTERING DEVICE FOR AQUARIUMS

BACKGROUND OF THE INVENTION

1. Field of the Invention

The present invention relates to a filtering device, and more particularly to a filtering device for aquariums.

2. Description of the Prior Art

A typical filtering device for aquariums is disclosed in U.S. Pat. No. 5,062,951 to Tominaga, in this patent, water is filtered and forced to flow to the bottom portion of the aquarium, and tends to flow upward through the gravels. Obviously, the impurities and wastes deposited on the gravels will be forced to move upward into the water contained in the aquarium, such that the water will be contaminated. In addition, the parts can not be easily disassembled, such that the parts can not be easily cleaned or replaced.

Another type of filtering device is disclosed in U.S. Pat. No. 4,186,093 to Willinger. In this patent, the contaminated water is drawn into the filtration compartment by upward flowing air; however, actually, the contaminated water can not be effectively drawn by the upward flowing air. In addition, the parts can not be easily disassembled, such that the parts can not be easily cleaned or replaced.

The present invention has arisen to mitigate and/or obviate the afore-described disadvantages of the conventional filtering devices for aquariums.

SUMMARY OF THE INVENTION

The primary objective of the present invention is to provide a filtering device for aquariums which can be operated effectively.

In accordance with one aspect of the invention, there is provided a filtering device for an aquarium comprising a lower housing engaged on a base and including a plurality of openings formed in a bottom portion thereof for communicating with the base and including a front portion having a plurality of openings formed therein, a casing coupled to the front portion of the lower housing and including a front surface and a rear surface each having a plurality of openings formed therein and communicate with the openings of the lower housing such that water contained in the aquarium may flow into the base via the first, second and third openings, an upper housing disposed above the lower casing and the casing, a cap engaged on the upper housing, a tube engaged in the lower housing for communicating the base to the upper housing, a connector disposed in the upper housing and including a first stub communicated with the tube and a second stub communicated with the first stub and extended upward through the cap, a motor engaged on the first stub for drawing water contained in the base, a mouth connected to the motor, and a pipe extended through the base and extended upward into the tube for supplying air into the tube, whereby, the water contained in the base is drawn into the aquarium via the tube and the connector and the mouth, and the water is caused to move upward through the tube and the second stub of the connector and to flow into the aquarium by the air when the motor is not energized.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
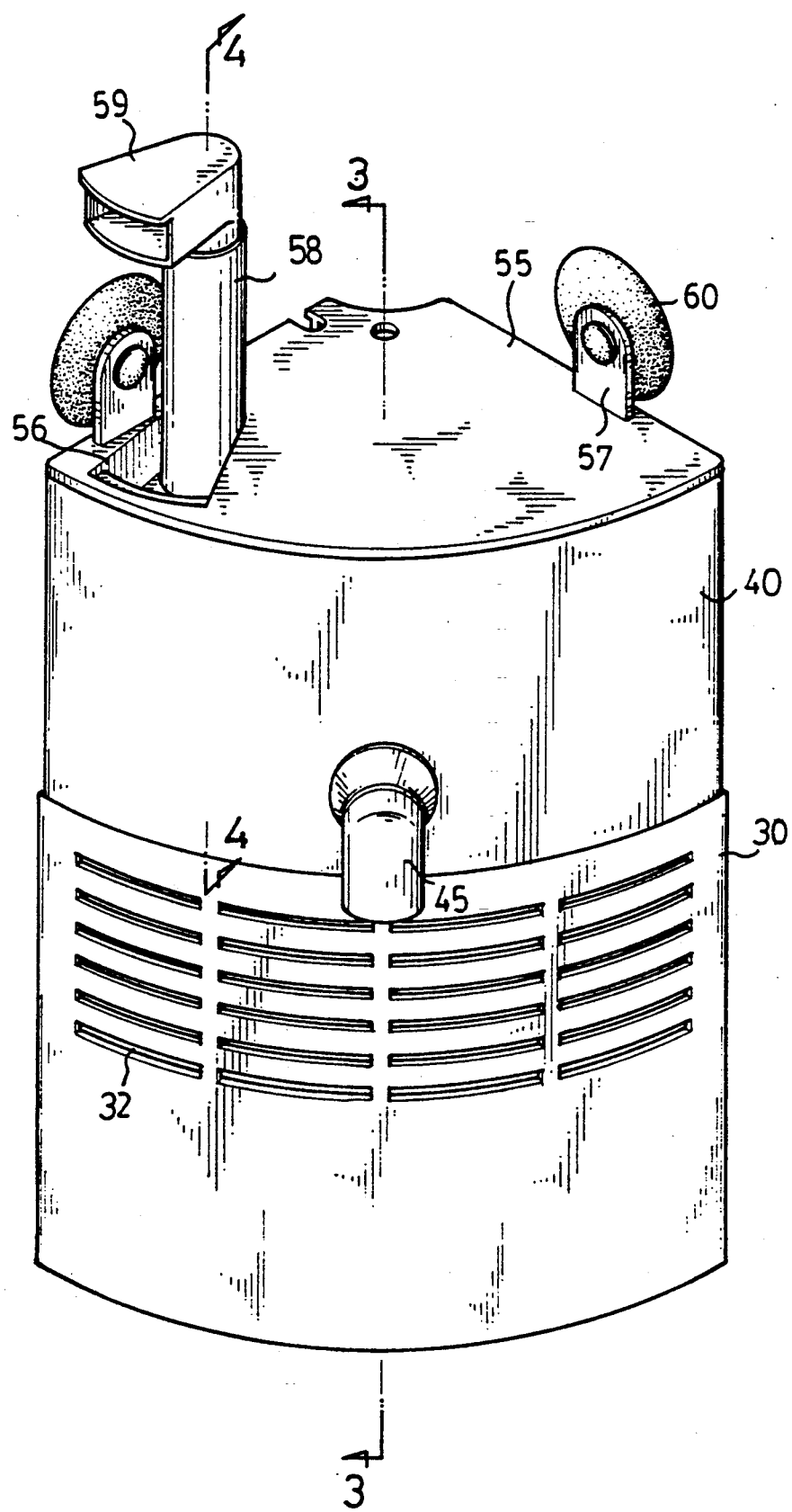
FIG. 1 is a perspective view of a filtering device in accordance with the present invention.
Figure 2:
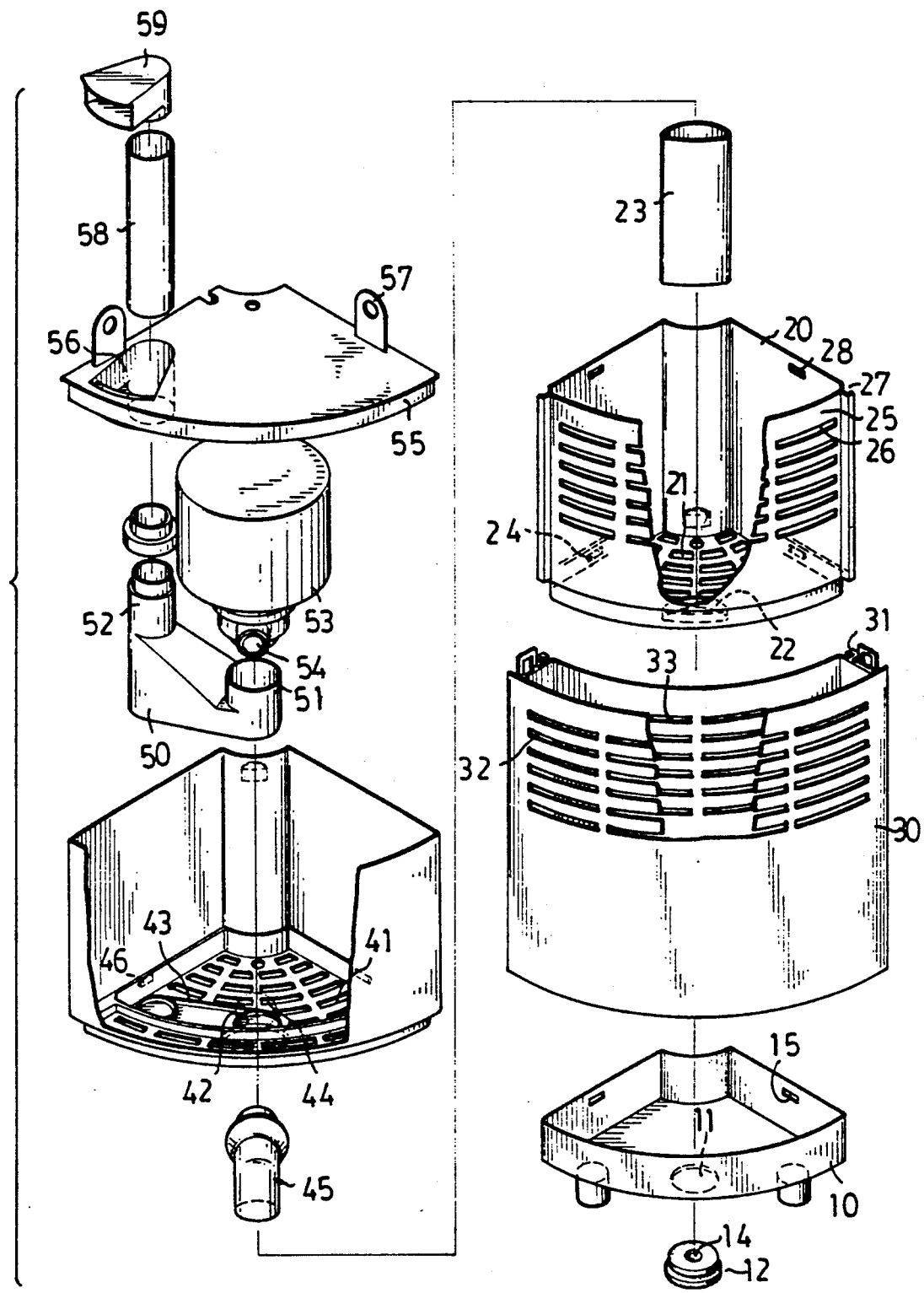
FIG. 2 is an exploded view of the filtering device.
Figure 3:
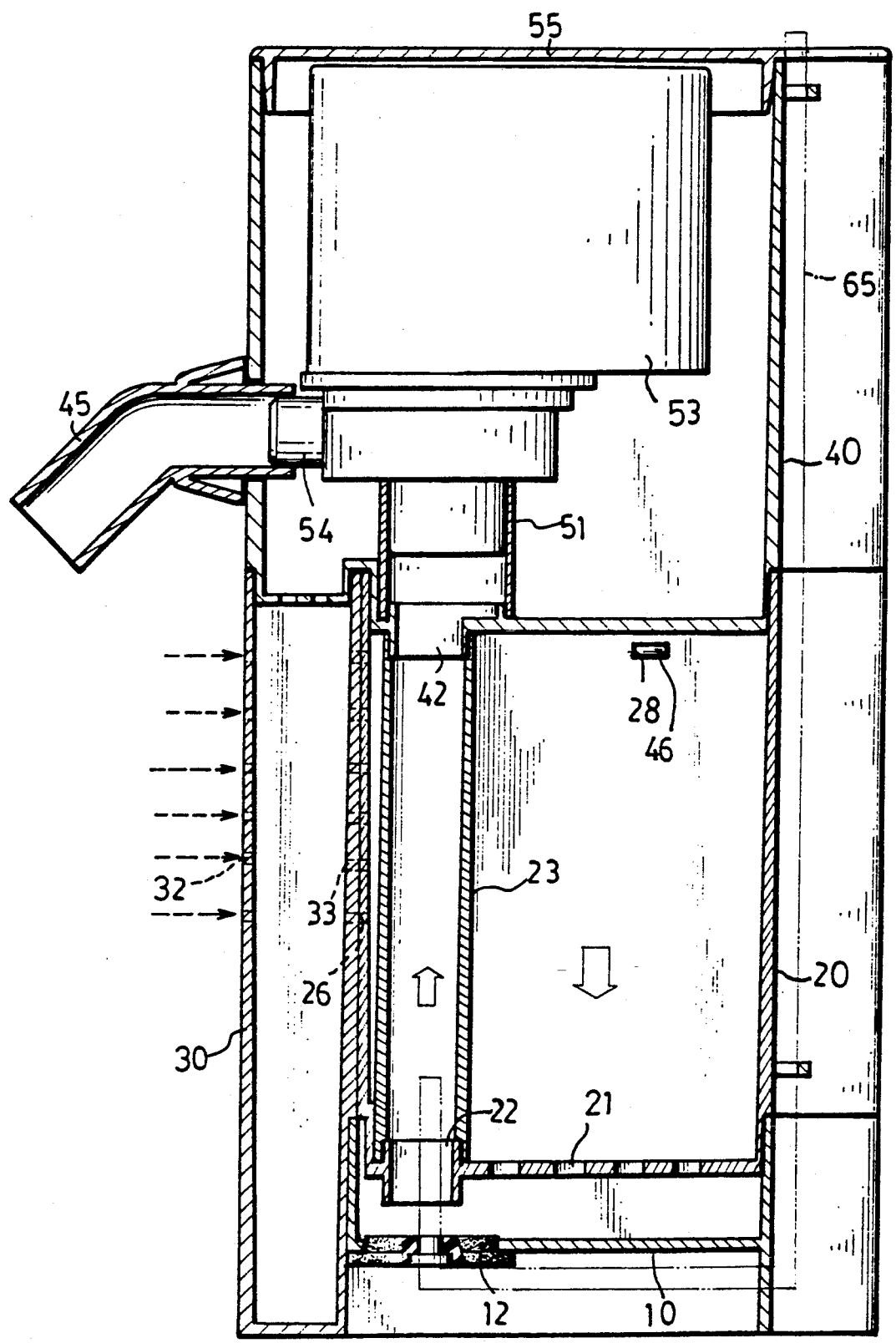
FIG. 3 is a cross sectional view taken along lines 3—3 of FIG. 1.

Referring to the drawings, and initially to FIGS. 1, 2 and 3 a filtering device for an aquarium in accordance with the present invention comprises generally a base 10 having an orifice 11 formed in the bottom thereof and enclosed by a plug 12 which has a hole 14 formed therein, two depressions 15 formed in the base 10, a lower housing 20 engaged on the base 10 and including a plurality of openings 21 formed in the bottom portion thereof and communicated with the base 10, an aperture 22 formed in the bottom portion and aligned with the orifice 11 of the base 10, a tube 23 having a lower end engaged with the aperture 22, two protrusions 24 formed on the bottom portion of the lower housing 20 for engagement with the depressions 15 of the base 10 so as to couple the lower housing 20 to the base 10, the lower housing 20 including a front surface 25 having a plurality of openings 21 formed therein and having a hook element 27 formed on each of the two side edges thereof.

Figure 5:
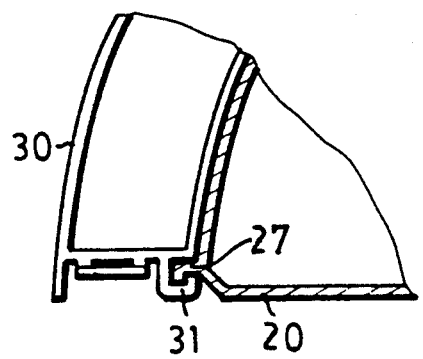
FIG. 5 is a schematic view illustrating one coupling portion of the filtering device.

A casing 30 includes two hook elements 31 formed in the rear portion thereof for engagement with the hook elements 27 of the lower housing 20 (FIG. 5) in order to couple the casing 30 to the lower housing 20. The casing 30 includes a plurality of openings 32, 33 formed in the front surface and the rear surface thereof respectively, the openings 33 are communicated with the openings 26 of the lower casing 20 such that water may flow into the lower casing 20 via the openings 32, 33 and 26. A filter medium (not shown) can be disposed in the casing 30 and in the lower casing 20 for filtering purposes.

Figure 4:
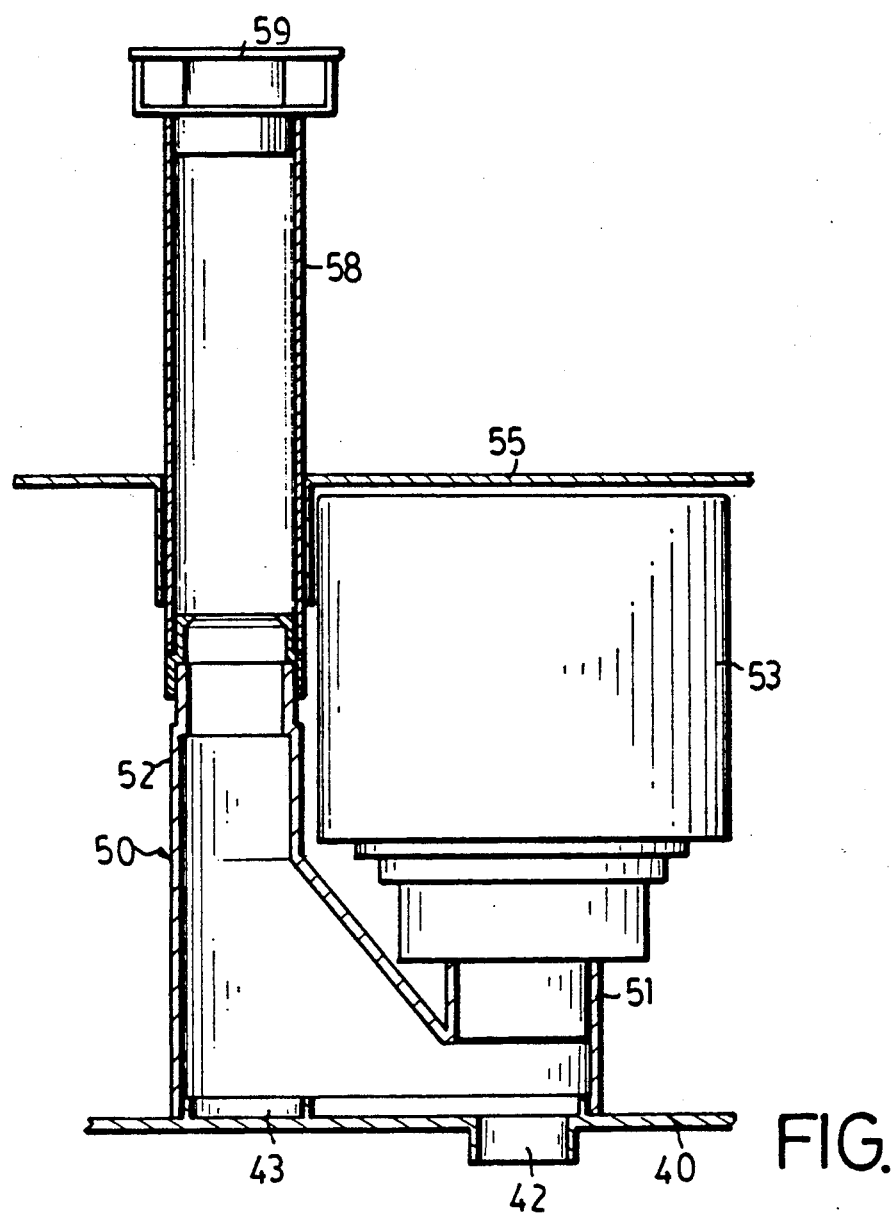
FIG. 4 is a cross sectional view taken along lines 4—4 of FIG. 1.

An upper housing 40 is engaged on both the lower housing 20 and the casing 30 and includes a plurality of openings 41 formed therein for communicating the upper housing 40 to the lower housing 20 and the casing 30 respectively. The lower housing 20 includes two depressions 28 for engagement with the protrusions 46 of the upper housing 40 so that the lower housing 20 and the upper housing 40 can be coupled together. An approach 42 is formed in the bottom of the upper housing 40 and engaged with the upper end of the tube 23, an oblong rib 43 is formed in the bottom of the upper housing 40, and the approach 42 is located within the oblong rib 43 (FIG. 4). A hole 44 is formed in the front surface of the upper housing 40 for engagement with a mouth 45. A connector 50 has a lower portion engaged on the oblong rib 43 and includes a first stub 51 engaged on the approach 42 and a second stub 52 communicated with the first stub 51. A pump motor 53 is engaged on the first stub 51 so as to draw the decontaminated water contained in the base 10 via the tube 23 and the first stub 51 and includes an outlet 54 connected to the mouth 45 so that the decontaminated water may flow into the aquarium. A cap 55 is engaged on the upper housing 40 and includes a dent 56 formed therein and two lugs 57 formed thereon.

Referring next to FIG. 4, and again to FIG. 2, a barrel 58 has a lower end extended through the dent 56 of the cap 55 and engaged with the second stub 52 and has an outlet 59 engaged on top thereof, such that the barrel 58 is communicated with the tube 23 via the approach 42. As shown in FIG. 1, a sucking disc 60 is attached to each of the lugs 57 for attaching the filtering device to the inner portion of the aquarium. As shown in FIG. 3, a pipe 65 vertically extends in the rear portion of the housings 20, 40 and extends through the plug 12 of the base 10 and extends upward into the tube 23 for supplying air or oxygen into the tube 23, as shown in FIG. 4, the oxygen flows into the aquarium via the connector 50 and the barrel 58 and the outlet 59. It is to be noted that the water can also be caused to be circulated by the air bubbles and caused to flow into the aquarium via the outlet 59, when the pump motor 53 is not energized.

In operation, as shown in FIG. 3, the contaminated water is drawn into the lower housing 20 via the openings 32, 33 of the casing 30 and the openings 26 of the lower housing 20 and is filtered by the filter medium disposed in the casing 30 and the lower housing 20, the decontaminated water is drawn by the pump motor 53 to flow into the aquarium via the tube 23 and the mouth 45. When the motor 53 is not energized, the water can also be circulated by the upward flowing air from the pipe 65. The lower housing 20 and the casing 30 are engaged to the upper housing 40 by the engagement between the depressions 28 and the corresponding protrusions 46 such that the lower housing 20 and the casing 30 can be easily disengaged from the upper housing 40.

Accordingly, the contaminated water can be effectively filtered by the filtering device in accordance with the present invention. It is to be noted that the filtering device can be easily disassembled so that the filtering device can be easily cleaned and such that the filter medium can be easily replaced.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A filtering device for an aquarium comprising a base, a lower housing engaged on said base and including a plurality of first openings formed in a bottom portion thereof for communicating with said base and including a front portion having a plurality of second openings formed therein, a casing coupled to said front portion of said lower housing and including a front surface and a rear surface each having a plurality of third openings formed therein and in fluid communication with said second openings of said lower housing wherein water contained in said aquarium may flow into said base via said first, second and third openings, an upper housing disposed above said lower casing and said casing, a cap engaged on said upper housing, a tube engaged in said lower housing for communicating said base to said upper housing, a connector disposed in said upper housing and including a first stub in fluid communication with said tube and a second stub in fluid communication with said first stub and extended upward through said cap, a pump motor engaged on said first stub for drawing water contained in said base, a mouth connected to said pump motor through a hole in a front surface of said upper housing, and a pipe extended through said base and extended upward into said tube for supplying air into said tube, wherein said water contained in said base is drawn into said aquarium via said tube and said connector and said mouth, and said water is caused to move upward through said tube and said second stub of said connector and to flow into said aquarium by said air when said motor is not energized.

2. A filtering device according to claim 1, wherein said base includes an orifice formed in a bottom portion thereof, and a plug engaged in said orifice, said pipe extends through said plug and extends upward into said tube.

3. A filtering device according to claim 1, wherein said lower housing including two first hook elements formed on said front portion of said lower housing, and said casing includes two second hook elements formed on said rear surface thereof for engagement with said first hook elements of said lower housing so as to couple said lower housing and said casing together.

4. A filtering device according to claim 1, wherein said upper housing includes an oblong rib formed in a bottom portion, an approach formed in said bottom portion of said upper housing and located in said oblong rib and communicated with said first stub of said connector, said connector is engaged on said oblong rib, and said tube includes an upper end extended upward through said approach for communicating with said connector.

* * * * *